INVENTOR.
CARL J. BONEM
BY *Watts & Fisher*
ATTORNEYS.

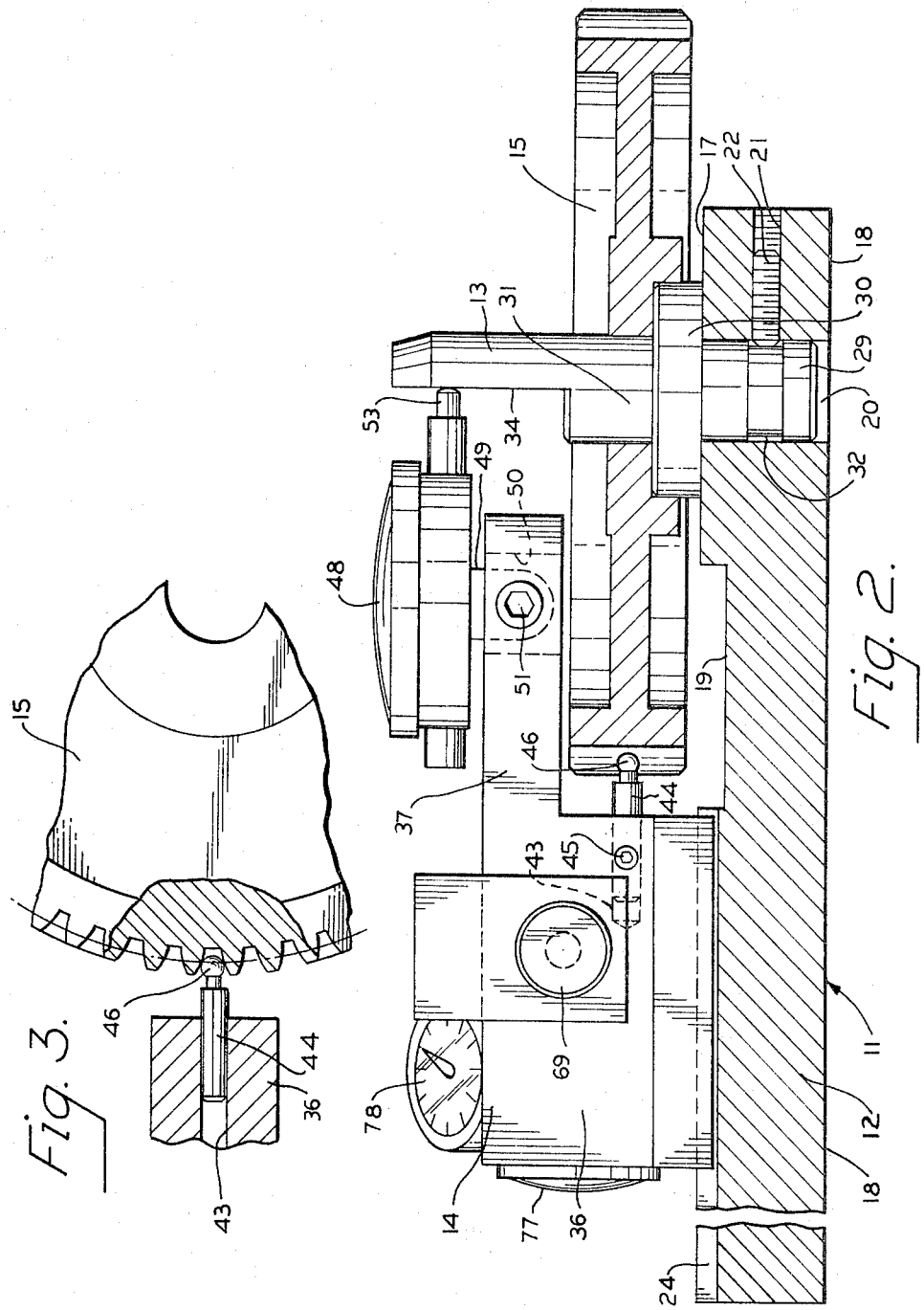

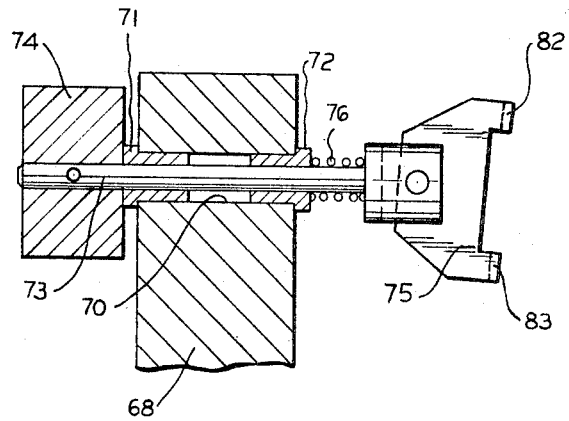
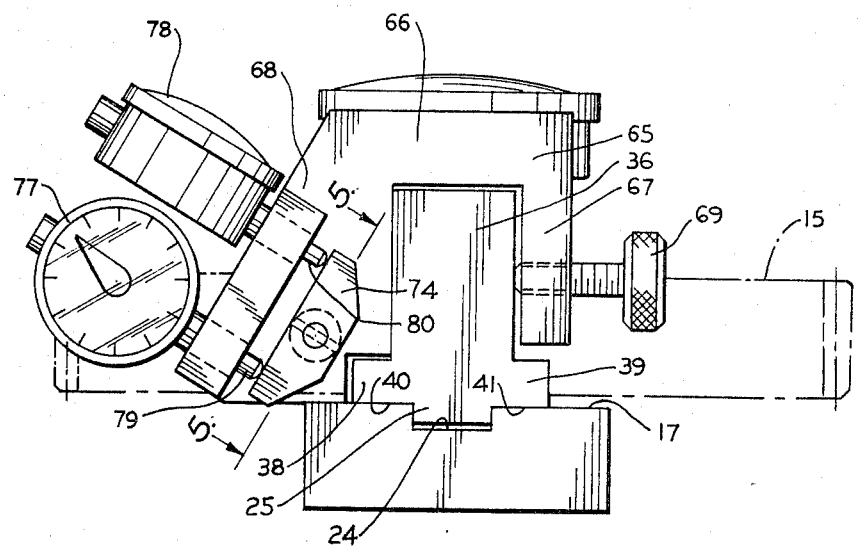

United States Patent Office 3,269,021
Patented August 30, 1966

3,269,021
GEAR CHECKING APPARATUS
Carl J. Bonem, Parma Heights, Ohio, assignor to White Motor Corporation, a corporation of Ohio
Filed Jan. 10, 1963, Ser. No. 250,521
16 Claims. (Cl. 33—179.5)

The present invention relates to gear inspection equipment and more particularly relates to apparatus which can check several gear dimensions.

In the manufacture of gears, it is necessary that a gear generating machine, such as a hobbing machine, be accurately adjusted for every gear dimension including the following critical dimensions.

(1) The pitch diameter which is the size of the gear at the pitch circle.

(2) The concentricity of the pitch circle with the center axis of the gear.

(3) The angle of the gear teeth, i.e., the helix angle in helical gears, or the proper squareness of the gear teeth as in spur gears.

Prior to the present invention, one problem has been the extensive and costly procedure necessary to adjust the machine for all of these critical dimensions. A large part of this costly procedure may be attributed directly to the fact that there has been no prior precision equipment which can check all of the above listed critical dimensions and certainly not simultaneously. Thus, it is often necessary to use a separate gear checking apparatus to check each such dimension.

In using these prior gear checking apparatus it has been the practice to adjust the generating machine for only one dimension at a time by cutting several test gear blanks and adjusting the machine after checking each test blank until the machine was accurately adjusted for that particular dimension. After the machine has been adjusted for all such dimensions, a final test gear blank was cut and taken to each checking apparatus to check each of the dimensions. Naturally, all these many checks by separate gear checking apparatus required a great deal of time during which both the machine and the operator were lost from the actual production of gears. Moreover, if the gear checking apparatus were set up for a different size gear being cut on another machine, the operator had to wait his turn. This could involve an even greater loss of time as the gear checking apparatus had to remain set up for that different sized gear until its machine was finally adjusted for the particular dimension being checked.

Another problem in the manufacture of gears is making periodic checks of the critical gear dimensions during the gear generating process so as to assure that the gear dimensions are within certain tolerance limits. These checks are made not only during hobbing but also during and after shaving of the gear as well. Prior gear checking apparatus are normally complicated devices, often of an electronic nature, usually located in a room separated from the manufacturing area and run by an operator especially trained in their use. Because of the remoteness of the several necessary gear checking apparatus and the time required for their use, it has been the practice to only spot check the gears at widely spaced intervals during production. Naturally, this sometimes results in several rejected gears before misadjustment of the machine or the wear of the cutter causing the trouble is discovered by spot checking of production gears.

The present invention provides a gear checking apparatus which greatly reduces these difficulties in the manufacture of gears. The present gear checking apparatus minimizes the time normally lost during set up of the gear generating machine. It also provides a ready means of keeping an accurate check on gear tolerances during production.

In one form, the present gear checker utilizes an instrument carrier supporting two locators which are spaced and mounted for relative movement, and an indicator device interposed between the locators to indicate a change in the locator spacing. One locator locates a predetermined point on the gear, and when used to locate the pitch circle of a gear, includes a small sphere segment sized to engage adjacent gear teeth at the pitch circle. The other locator locates the center axis of the gear. In use, the instrument carrier is movable towards the gear endwise until both locators have located their respective points on the gear. A deviation in the gear dimension from the proper gear dimension will be shown by the measuring device. Concentricity of the pitch circle to the center axis is automatically determined when the instrument carrier is positioned in a plurality of checking positions around the gear by noting any variation among the measured devices, if any, for each such checking position. The carrier also includes a third locator which engages a gear tooth along at least one of its longitudinal faces to measure the tooth angle at each checking position as the first two locators are locating their respective places on the gear.

Thus, a most important advantage of the present gear checking apparatus is its ability to check several critical gear dimensions including concentricity and tooth angle lead error at substantially the same time and with one gear set up. Another advantage is its relative simplicity of operation. Thus, the relatively unqualified machine operator will be able to use the gear checking apparatus to check gear dimensions. In addition the simplicity of the testing apparatus and its few parts make it a low-cost item as compared to the highly complex mechanisms of prior gear apparatuses.

The simplicity of its structure and operation, and its low cost of manufacture make it practical to place one of the present gear checking apparatuses at each gear cutting machine for use by its operator or the floor inspector during setup and manufacture. Thus, a great deal of time is saved by the use of the present gear checking apparatus both during setup and manufacture because the operator can simultaneously check all gear dimensions at the machine site. By using the present gear checking apparatus, the operator or setup man can adjust the machine for all gear dimensions after each check of the test gear blank. After the machine appears to be accurately adjusted for all the gear dimensions, then, and only then, the operator may take the test gear blank to the several precision gear checking apparatus for a final check of each gear dimension if a final check is desired. Thus, the present gear checking apparatus is not necessarily intended as a replacement for the precision gear checking apparatus, but as a supplement to them, if desired, to eliminate the need to use these precision apparatus until the final check. In using the present gear checking apparatus to supplement the precision checking apparatus, it has been found that the cost involved in a setup for a helical gear can be reduced by as much as two-thirds.

Accordingly, it is an object of the present invention to provide a new and improved gear checking apparatus which can check several critical gear dimensions at substantially the same time and with a single setup.

Another object of the present invention is to provide a new and improved gear checking apparatus which is able to check pitch diameter, concentricity of the pitch circle to the gear center axis, and the gear tooth lead angle.

Still another object of the present invention is to provide a new and improved gear checking apparatus which is uncomplicated in construction and operation.

Yet another object of the present invention is to provide a new and improved gear-checking apparatus which can be economically and conveniently located near the gear generating machine and may be used by most any machine operator without special training.

Other objects and a fuller understanding of the invention may be had by referring to the following description and claims taken in conjunction with the accompanying drawings, in which:

FIGURE 2 is a side, longitudinal view; with portions removed and parts in cross section, of the gear checking apparatus of FIGURE 1;

FIGURE 3 is a fragmentary view, with parts in section, of a portion of the gear checking apparatus;

FIGURE 4 is an end view of the gear checking apparatus of FIGURE 1; and

FIGURE 5 is a sectioned view taken along line 5—5 of FIGURE 4.

Figure 1:
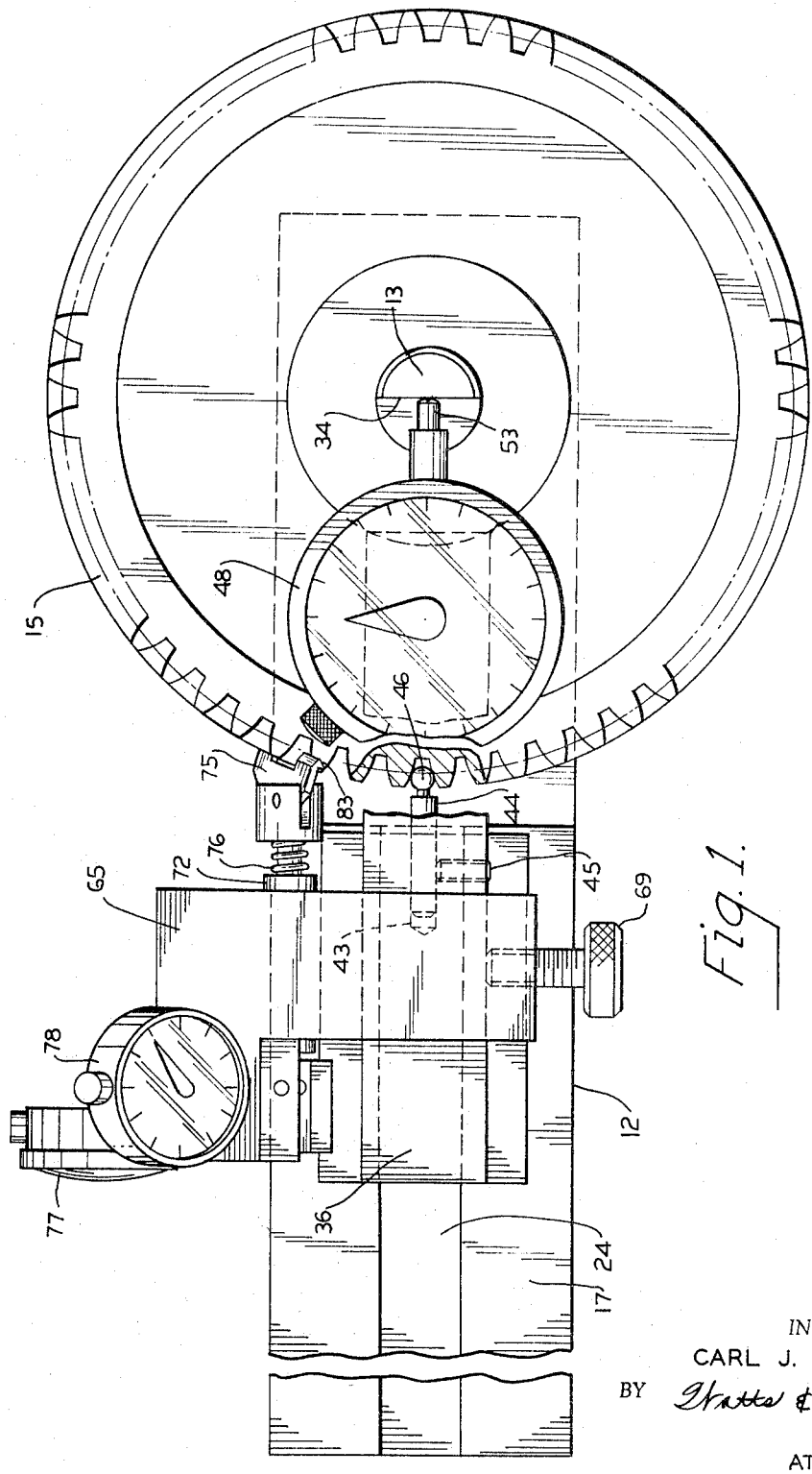
FIGURE 1 is a top plan view, with portions removed, of the gear checking apparatus of the present invention.

Referring now to the drawings which illustrate a preferred embodiment of the present invention, there is shown a gear checking apparatus which is generally designated by the reference character 11. The gear checking apparatus 11 includes a base 12, a gear mounting spindle 13 secured to one end of the base 12, and an instrument carrier 14 movably mounted on the other end of the base 12. A helical gear 15 is shown mounted on the spindle 13 to illustrate the use of the apparatus 11.

The base 2 is an elongated rectangular member having a top surface 17 and a bottom surface 18. A recess 19 is provided in the top surface 17 between the sides of the base 12 to provide additional clearance for gears mounted on the spindle 13. The base 12 further includes a vertical bore 20 extending between the top and bottom surface 17, 18 for receiving one end of the spindle 13. A bore 21 extends longitudinally from one end of the base 12 to the vertical bore 20. The longitudinal bore 21 threadably receives a set screw 22 which engages the spindle 13 to releaseably lock it to the base 12. A recess 24 extends longitudinally from the other end of the base 12 toward the spindle 13. The longitudinal recess 24 defines a rectangular keyway which receives a rectangular projection 25 of the instrument carrier 14. The center of the keyway 24 and the center of the spindle 13 are located on the longitudinal center line of the base 12.

The spindle 13 includes a lower portion 29, a collar portion 30, and an upper portion 31. The lower spindle portion 29 is received in the vertical bore 20 and includes a reduced portion 32. The reduced portion 32 forms a keyway for receiving an end of the set screw 22 to firmly lock the spindle 13 against movement in the bore 20. The collar portion 30 is adjacent the top surface 17 and forms a seat on which the gear 15 rests. The upper spindle portion 31 is sized to snugly receive the center bore of the gear 15 and to fix the center axis of the gear 15 relative to the base 12 and the carrier 14. The gear 15 as supported by the collar 30 and as fixed by the upper spindle portion 31, is rotatable relative to the carrier 14.

A portion of the upper spindle portion 31 is removed to provide a gear axis locating surface 34. The axis locating surface 34 defines a plane on a center line of the spindle 13 and, therefore, on the center line of the gear center axis. The plane defined by the surface 34 is at right angles to the longitudinal center line of the base 12.

The instrument carrier 14 includes a main body portion 36 and an overhanging arm portion 37. The main body portion 36 further includes a pair of oppositely extending leg portions 38, 39 and the rectangular projection 25. Bottom surfaces 40, 41 of the main body portion 36 coact with the top surface 17, and the side surfaces of the projection 25 coact with the sides of the keyway 24, to fix the main body portion 36 relative to the base 12 for all movement other than longitudinally of the base 12. Thus the instrument carrier 14 is mounted on the base 12 for reciprocal rectilinear movement relative to the spindle 13 and the gear 15 mounted on it. A bore 43 extends longitudinally in the main body portion 36 and is centered on the longitudinal centerline of the base 12. A gear tooth and pitch line locator 44 is disposed in the bore 43. A set screw 45 securely locks the pitch line locator 44 to the instrument carrier 14. The pitch line locator 44 includes a spherical end 46 spaced from the carrier 14 and sized to engage adjacent gear teeth at the pitch circle of the gear 15. The locator 44 may also be used to locate other points on the gear teeth, for example, the extreme outside surface of the teeth to check the outside radius of the gear.

An indicator dial 48 of a well known construction is attached to the overhanging arm portion 37 by a tab 49 removably secured within a slot 50 in the arm portion 37 by a fastener 51. The indicator dial 48 includes a resiliently biased plunger which is a gear axis locator having an adjustable end 53 which abuts the axis locating surface 34 when the carrier is moved toward the spindle 13. The indicator dial is effectively interposed between the gear axis locator end 53 and the locator 44 and indicates changes in their relative spacing.

One manner of setting the gear checking apparatus 11 for checking gear dimensions is to use a master gear having the desired dimensions. The master gear is positioned on the spindle 13 in place of the gear 15. The instrument carrier 14 is then moved toward the spindle until the locator spherical end 46 abuts two adjacent teeth at their pitch circle at which time the resiliently biased locator end 53 is already abutting the axis locating surface 34. The indicator dial is then preferably adjusted to indicate a zero reading. The instrument carrier 14 is backed away from the master gear and the master gear is replaced with the gear 15 which is to be checked. The instrument carrier 14 is again moved toward the spindle 13 until the spherical end 46 engages the two adjacent teeth of the gear 15. If the pitch radius of the test gear 15 is different from that of the master gear, the dial will no longer read zero but will indicate some measure of deviation. The test gear 15 may be further checked for pitch radius at other locations by backing the instrument carrier and rotating the gear 15 to another checking position. Concentricity of the pitch circle to the gear center axis is determined by a variation in the deviation, if any, as indicated by the indicator dial for all of the checking positions. If there is no variation in the deviation readings for all of the checking positions, then the pitch circle is concentric with the center axis. The outside radius of the gear may also be checked by positioning the gear so that the locator spherical end 46 abuts the outermost surface on a gear tooth when the carrier is moved toward the spindle. Thus, the outside radius as well as the pitch radius of the gear may be checked without making any changes in the checking apparatus setup except for rezeroizing of the dial indicator if desired.

A saddle 65 is removably secured to the instrument carrier 14 and carries the mechanism for determining the tooth angle relative to the gear axis. The saddle 65 includes an upper portion 66 and leg portions 67, 68. As shown in FIGURE 5 the leg portion 68 includes a longitudinally extending bore 70. A pair of sleeve type bearings 71, 72 are partially disposed within opposite ends of the bore 70. A shaft 73 is rotatably journaled in the bearings 71, 72. A paddle 74 is secured at its midpoint to one end of the shaft 73 and an anvil 75 is pivotally secured to the other end of the shaft 73. The paddle 74 follows the angular movement of the anvil 75 as both are fixed against angular movement relative to the shaft 73. The anvil 75 includes a pair of oppositely disposed angular projections 82, 83 projecting from the planar surface of the anvil 75. The projections 82, 83 engage only the extremities of the longitudinal face surface of the tooth and maintain the anvil 75 spaced from the tooth face surface intermediate its extremities. When a helical gear is being checked the angular projections serve to bridge the crown in the tooth longitudinal face surface so that the check of the helix angle is unaffected by this crown. A spring 76 is disposed between the anvil 75 and the bearing 72 to normally bias the anvil away from the saddle member 65. A pair of indicator dials 77, 78 are secured to the leg portion 68 and include resiliently biased plungers 79, 80 respectively. The plungers 79, 80 engage opposite ends of the paddle 74 and measure the angular movement of the anvil 71. Each dial 77, 78 indicates one-half of the total tooth angle. Each dial, therefore, will indicate one-half of the total deviation, if any, in the tooth angle.

A knurled set screw 69 is threadably mounted in the leg portion 67 to releasably clamp the saddle 65 to the body portion 36. The indicator dials 77, 78 are set for their zero position from the master gear at the same time as the indicator dial 48 is set for the pitch and outside diameters. When the instrument carrier 13 is moved into the master gear to where the locator ends 46, 53 are in their abutting position, the saddle 65 is positioned on the body portion 36 until the anvil projections 82, 83 are in the proper position engaging the face of one of the gear teeth at its pitch circle. The saddle 65 is then clamped to the body portion 36 by tightening the knurled set screw 69.

Use of the gear checking apparatus 11 during actual gear production does not require that its user understand its checking operation. One skilled in the use of the checking apparatus, such as the shop foreman, can set up the apparatus from a master gear and then merely instructs the operator to place each gear to be checked on the spindle 13, move the instrument carrier 14 toward the gear until both indicators are abutting their respective gear locations, and then note the position of the needle on the indicator dial to determine whether the gear dimensions are within the tolerance limits. Such tolerance limits for the several gear dimensions may be marked on the face of the dial so that the operator merely watches to see that the indicator needle is not beyond the dial face markings. Thus, with the present gear checking apparatus a constant check on gear dimensions for every gear machine is practical as well as convenient. Moreover, with the gear checking apparatus 11 located near or next to the hobbing or shaving machine, the operator is able to make such production checks while other gears are being machined so as to never leave his machine unnecessarily idle.

Briefly stated, the gear checking apparatus of the present invention is believed to comprise essentially a gear holding member; an instrument carrier having a gear axis locator, a gear tooth locator, and an indicator interposed between the locators to indicate their relative positioning; and the carrier and the gear holding member being relatively movable toward one another until both of the locators have located their respective gear positions. The invention further contemplates that the carrier and a gear on the gear holding member be relatively rotatable to provide a plurality of checking positions around the gear, and that the instrument carrier include a third locator engageable with a longitudinal face of the gear tooth to check the tooth angle simultaneously with a dimension check by the other locators at each checking position.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A gear checking apparatus comprising:
(a) a carrier movable relative to a gear to be checked;
(b) a plurality of locators carried by said carrier;
(c) a first of said locators being adapted to locate the gear center axis;
(d) a second of said locators being spaced from said first locator and adapted to locate a predetermined point on the gear teeth;
(e) said first and second locators being relatively movable;
(f) indicator means interposed between said locators to indicate the relative spacing of said locators as said locators locate their respective places on the gear;
(g) a third of said locator being rotatably mounted on said carrier and adapted to engage portions of a tooth side face;
(h) a second indicating means connected to said third locator to indicate the tooth angle by measuring angular movement of said third locator; and,
(i) said carrier being movable toward the gear until said first and second locators have both located their respective places on the gear and said third locator is against the face of a gear tooth whereby relative movement of said first and second locators checks a gear dimension and angular movement of said third locator checks the gear tooth angle.

2. A gear checking apparatus comprising:
(a) an elongated base;
(b) a spindle standing upright at one end of said base, said spindle being sized to receive the center bore of a gear so as to fix the center axis of the gear relative to the base;
(c) a carrier mounted on said base for reciprocal rectilinear movement relative to said spindle;
(d) said spindle having a surface defining a plane parallel to the axis of the gear and at right angles to the rectilinear movement of the carrier;
(e) first and second locators carried by said carrier;
(f) said first locator having one end spaced from said carrier and positioned to abut said spindle surface;
(g) said second locator having one end spaced from said first locator end and positioned to abut a tooth surface of the gear;
(h) said first and second locators being relatively movable;
(i) at least one of the locators being adjustable relative to the carrier to set said locator end spacing at a predetermined dimension; and,
(j) an indicator interposed between said first and second locators to indicate a change in said locator end spacing whereby said carrier is movable toward said spindle until both said locators are abutting their respective surfaces in which event said locator will indicate any change in locator end spacing.

3. The device of claim 2 including, in combination:
(k) one of said locators being movable relative to said carrier and being resiliently biased to normally space said locator ends greater than said predetermined dimension;
(l) said indicator being adjustable to provide a selected size reading when said locator ends are spaced said predetermined dimension; and,
(m) said resiliently biased locator abutting its surface prior to the abutment of the other locator against its surface so that when both said locators are abutting said surfaces said indicator will indicate zero deviation from said selected size reading if said locators are spaced said predetermined dimension.

4. The gear checking apparatus of claim 2 wherein said one end of said second locator is sized to engage adjacent gear teeth at the pitch circle of the gear.

5. The gear checking apparatus of claim 4 wherein said one end of the second locator is a sphere segment.

6. The gear checking apparatus of claim 4 wherein the spindle rotatably mounts the gear whereby the gear is positionable in a plurality of checking positions relative to said carrier.

7. A gear checking apparatus comprising:
(a) an elongated base;
(b) a spindle standing upright at one end of said base, said spindle being sized to receive the center bore of a gear so as to fix the center axis of the gear relative to the base;
(c) a carrier mounted on said base for reciprocal rectilinear movement relative to said spindle;
(d) said spindle having a surface defining a plane parallel to the axis of the gear and at right angles to the rectilinear movement of the carrier;
(e) a plurality of locators carried by said carrier;
(f) a first of said locators having one end spaced from said carrier and positioned to abut said spindle surface;
(g) a second of said locators having one end spaced from said first locator end and positioned to abut a tooth surface of the gear;
(h) said first and second locators being relatively movable;
(i) at least one of the locators being adjustable relative to the carrier to set said locator end spacing at a predetermined dimension;
(j) an indicator interposed between said first and second locators to indicate a change in said locator end spacing;
(k) a third of said locators rotatably mounted on said carrier and having one end spaced from the carrier and positioned to engage a longitudinal gear tooth surface when said first and second locators are abutting their respective surfaces; and
(l) a second indicator mounted on said carrier and connected to said third locator to indicate angular movement of said third locator whereby said carrier is movable toward said spindle until said first and second locators are abutting their respective locating surfaces to check a gear dimension and said third locator is engaging said longitudinal tooth surface to check the gear tooth angle.

8. The device of claim 7 wherein said third locator is positioned to engage the longitudinal tooth surface at the pitch circle of the gear when said first and second locaters are abutting their respective surfaces.

9. The device of claim 8 wherein said third locator includes spaced projections engageable with the longitudinal tooth surface at its extremities.

10. The gear checking apparatus of claim 7 wherein said third locator includes a shaft rotatably journaled on the carrier, an anvil positioned at one end of the shaft and engageable with the longitudinal tooth surface, and a paddle fixed between its opposite ends to the other end of the shaft; and said second indicator includes two indicator dials each having a resiliently biased plunger engageable with an opposite end of the paddle whereby each such dial will indicate one-half of the gear tooth angle when said anvil is engaging said tooth longitudinal surface.

11. A gear checking apparatus comprising:
(a) an elongated base;
(b) a spindle standing upright at one end of said base, said spindle being sized to receive the center bore of a gear so as to fix the center axis of the gear relative to the base;
(c) a carrier mounted on the said base for reciprocal rectilinear movement relative to said spindle;
(d) said spindle having a surface defining a plane parallel to the axis of the gear and at right angles to the rectilinear movement of the carrier;
(e) a plurality of locators carried by said carrier, said locators being relatively movable;
(f) a first of said locators having one end spaced from said carrier and positioned to abut said spindle surface;
(g) a second of said locators having one end spaced from said first locator end and positioned to abut a tooth surface of the gear;
(h) one of said locators including an indicator dial, an end of said one of said locators being resiliently biased relative to said dial; and,
(i) at least one of the locators being adjustable relative to the carrier to set said locator end spacing at a predetermined dimension whereby said locator end spacing may be set at a predetermined distance from a master gear on said spindle by adjusting the adjustable locator relative to the carrier and by setting the indicator to a first reading when both are in the abutting position whereupon a gear dimension may be checked on said gear checking apparatus by any deviation from said indicator first reading.

12. A gear checking apparatus comprising:
(a) a carrier movable relative to a gear to be checked;
(b) a plurality of locators carried by said carrier;
(c) a first of said locators being adapted to locate the gear center axis;
(d) a second of said locators being spaced from said first locator and being adapted to locate a predetermined point on the gear teeth, said second locator having one end spaced from said carrier and sized to engage adjacent gear teeth at the pitch circle of the gear;
(e) said first and second locators being relatively movable;
(f) indicator means interposed between said locators to indicate the relative spacing of said locators as said locators locate their respective places on the gear;
(g) said carrier being movable toward the gear until said first locator has located the gear axis and said second locator is abutting two adjacent teeth at the pitch circle of the gear whereby the indicator means indicates a change in the relative spacing of said locators;
(h) a third of said locators being rotatably mounted on said carrier and adapted to engage portions of a tooth side face;
(i) a second indicating means connected to said third locator to indicate the tooth angle by measuring angular movement of said third locator; and,
(j) said third locator is against the tooth side face when both said first and second locators have located their respective places on the gear whereby angular movement of said third locator checks the gear tooth angle.

13. A gear checking apparatus comprising:
(a) a base;
(b) a gear support member projecting from said base for receiving a gear and fixing the center axis of the gear relative to the base;
(c) a locator carrier member reciprocally movable on the base in a rectilinear manner relative to the gear support member;
(d) a gear tooth locator carried by said carrier member, said gear tooth locator including at least a segment of a spherical member sized to engage adjacent gear teeth at the pitch circle of a gear carried by said gear support member as the carrier is moved toward the gear support member;
(e) a gear axis locator carried by one of said members;
(f) a gear axis locator surface on the other of said members and being disposed transversely to the path of movement of the carrier member so as to be engaged by the gear axis locator as the carrier member is moved toward the gear support member;
(g) said locators being relatively movable; and,
(h) indicator means interposed between said locators to indicate the relative spacing of said locators whereby a gear dimension relative to the central axis of the gear is checked by moving the carrier member toward the gear support member until said axis locator abuts said gear axis locator surface and the gear tooth locator abuts two adjacent gear teeth.

14. The apparatus of claim 13 wherein the gear axis locator surface is on the gear support member and defines a plane extending transversely to the direction of movement of the carrier member and intersects the axis of a gear on the gear support.

15. The apparatus of claim 14 wherein said carrier and the gear are relatively rotatable to position the locators in a plurality of checking positions around the gear.

16. A gear checking apparatus comprising:
  (a) a base;
  (b) a gear support member projecting from said base for receiving a gear and fixing the center axis of the gear relative to the base;
  (c) a locator carrier member reciprocally movable in a line on the base in a rectilinear manner relative to the gear support member so as to be movable toward and away from the gear center axis;
  (d) a gear tooth locator carried by said carrier member for engaging a predetermined point on a tooth of a gear carried by said gear support member as the carrier is moved in said rectilinear manner toward the gear support member and toward the gear center axis;
  (e) a gear axis locator carried by one of said members;
  (f) a gear axis locator surface on the other of said members and being disposed transversely to the path of rectilinear movement of the carrier member so as to be engaged by the gear axis locator as the carrier member is moved in said rectilinear manner toward the gear support member and toward the gear center axis;
  (g) said locators being relatively movable in a rectilinear manner parallel to the rectilinear movement of the locator carrier; and,
  (h) indicator means operatively interposed between said locators and being responsive to relative rectilinear movement of the locators to indicate relative spacing of the locators along the line of rectilinear movement of the locator carrier as the carrier member is moved in said rectilinear manner toward the gear center axis whereby a gear dimension relative to the central axis of the gear is checked by moving the carrier member toward the gear support member until said axis locator abuts said gear axis locator surface and the gear tooth locator is at the selected point on the gear tooth.

References Cited by the Examiner

UNITED STATES PATENTS

| | | | |
|---|---|---|---|
| 2,192,343 | 3/1940 | Earl et al. | 33—185 |
| 2,202,638 | 5/1940 | Praeg | 33—179.56 |
| 2,367,004 | 1/1945 | Chitwood | 33—179.5 |
| 2,659,158 | 11/1953 | Cobb | 33—179.5 |
| 2,727,313 | 12/1955 | Wonders | 33—174 |
| 3,167,867 | 2/1965 | Reef | 33—179.5 |

LEONARD FORMAN, *Primary Examiner.*

SAMUEL S. MATTHEWS, ISAAC LISANN, *Examiners.*